United States Patent
Lee

(10) Patent No.: US 11,360,893 B2
(45) Date of Patent: Jun. 14, 2022

(54) APPARATUS AND METHOD FOR MANAGING FIRMWARE THROUGH RUNTIME OVERLAY

(71) Applicant: SK hynix Inc., Gyeonggi-do (KR)

(72) Inventor: Seok-Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 118 days.

(21) Appl. No.: 16/845,919

(22) Filed: Apr. 10, 2020

(65) Prior Publication Data

US 2021/0056026 A1 Feb. 25, 2021

(30) Foreign Application Priority Data

Aug. 22, 2019 (KR) .................. 10-2019-0103033

(51) Int. Cl.
*G06F 12/0811* (2016.01)
*G06F 12/0815* (2016.01)
*G06F 12/0804* (2016.01)
*G06F 12/0873* (2016.01)
*G06F 12/14* (2006.01)
*G06F 9/4401* (2018.01)
*G06F 13/16* (2006.01)
*G06F 12/02* (2006.01)

(52) U.S. Cl.
CPC ........ *G06F 12/0811* (2013.01); *G06F 9/4401* (2013.01); *G06F 12/0246* (2013.01); *G06F 12/0804* (2013.01); *G06F 12/0815* (2013.01); *G06F 12/0873* (2013.01); *G06F 12/1458* (2013.01); *G06F 13/1668* (2013.01); *G06F 2212/1021* (2013.01)

(58) Field of Classification Search
CPC ............ G06F 12/0811; G06F 12/0246; G06F 12/0804; G06F 12/0815; G06F 12/0873; G06F 12/1458; G06F 9/4401; G06F 13/1668; G06F 2212/1021
See application file for complete search history.

(56) References Cited

U.S. PATENT DOCUMENTS

| | | | |
|---|---|---|---|
| 5,956,749 A * | 9/1999 | Kakihara | G06F 11/1441 711/162 |
| 9,891,908 B2 * | 2/2018 | Tverdal | G06F 8/66 |
| 10,559,368 B1 * | 2/2020 | Yang | G11C 16/0483 |

(Continued)

FOREIGN PATENT DOCUMENTS

| KR | 10-0631780 | 10/2006 |
|---|---|---|
| KR | 10-1636892 | 7/2016 |
| KR | 10-2020-0116373 A | 10/2020 |

*Primary Examiner* — Prasith Thammavong
(74) *Attorney, Agent, or Firm* — IP & T Group LLP

(57) ABSTRACT

A memory system may include: a non-volatile memory device suitable for storing firmware; a volatile memory device comprising a write cache region for temporarily storing write data to be programmed into the non-volatile memory device and a firmware cache region for loading the firmware from the non-volatile memory device; and a controller suitable for: moving, to the write cache region, changeable firmware data that is generated or modified in the firmware cache region during an operation of the controller; programming the changeable firmware data, after it is moved into the write cache region, into the non-volatile memory device; and generating, in the firmware cache region, access information of the changeable firmware data.

19 Claims, 11 Drawing Sheets

(56) References Cited

U.S. PATENT DOCUMENTS

| | | | |
|---|---|---|---|
| 10,839,928 B1* | 11/2020 | Yang | G11C 16/3463 |
| 2003/0163640 A1* | 8/2003 | Pruett | G06F 3/0607 |
| | | | 711/114 |
| 2005/0158100 A1* | 7/2005 | Yamaguchi | G06F 3/123 |
| | | | 400/62 |
| 2006/0259207 A1* | 11/2006 | Natsume | G06F 11/1433 |
| | | | 701/1 |
| 2009/0210867 A1* | 8/2009 | Suzuki | G06F 8/65 |
| | | | 717/168 |
| 2010/0049900 A1* | 2/2010 | Chiou | G06F 8/65 |
| | | | 711/103 |
| 2011/0292807 A1* | 12/2011 | Shah | H04W 40/04 |
| | | | 370/237 |
| 2012/0297126 A1* | 11/2012 | Sanada | G06F 12/0646 |
| | | | 711/103 |
| 2014/0149644 A1* | 5/2014 | Park | G06F 8/654 |
| | | | 711/103 |
| 2015/0130613 A1* | 5/2015 | Fullam | G08B 21/043 |
| | | | 340/539.12 |
| 2015/0154086 A1* | 6/2015 | Rabeler | G06F 11/1469 |
| | | | 714/15 |
| 2015/0169443 A1* | 6/2015 | Lee | G06F 12/0246 |
| | | | 711/103 |
| 2015/0363323 A1* | 12/2015 | Yu | G06F 3/0619 |
| | | | 711/133 |
| 2016/0234396 A1* | 8/2016 | Yasukawa | B41J 29/38 |
| 2017/0168725 A1* | 6/2017 | Tamura | G06F 3/0619 |
| 2018/0165455 A1* | 6/2018 | Liguori | G06F 9/4416 |
| 2018/0196748 A1* | 7/2018 | Ambrosi | G06F 12/0246 |
| 2019/0042229 A1* | 2/2019 | Kotary | G06F 8/654 |
| 2019/0108347 A1* | 4/2019 | Ghetie | G06F 9/22 |
| 2019/0108889 A1* | 4/2019 | Gholamipour | G11C 16/349 |
| 2019/0243637 A1* | 8/2019 | Nachimuthu | G06F 3/0614 |
| 2019/0377644 A1* | 12/2019 | Kulkarni | G06F 11/1435 |
| 2020/0057653 A1* | 2/2020 | Lee | G06F 11/1417 |
| 2020/0133654 A1* | 4/2020 | Lei | G06F 8/65 |
| 2020/0244826 A1* | 7/2020 | Ido | H04N 1/00129 |
| 2020/0349009 A1* | 11/2020 | Samuel | G06F 11/1433 |

* cited by examiner

APPARATUS AND METHOD FOR MANAGING FIRMWARE THROUGH RUNTIME OVERLAY

CROSS-REFERENCE TO RELATED APPLICATION

This application claims priority under 35 U.S.C. § 119 to Korean Patent Application No. 10-2019-0103033, filed on Aug. 22, 2019, which is incorporated herein by reference in its entirety.

BACKGROUND

1. Field

Various embodiments of the invention relate to a memory system, and particularly, to a method and apparatus for managing firmware of a memory system through runtime overlay.

2. Discussion of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device used as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments are directed to a memory system and data processing system and an operating method thereof, which can minimize complexity and performance degradation of the memory system, can maximize use efficiency of a memory device, and can rapidly and stably process data with respect to the memory device.

Also, various embodiments are directed to a method and apparatus, which can optimize the size of a memory used for an operation of firmware by managing the firmware of a memory system using a runtime overlay scheme.

Also, various embodiments are directed to a method and apparatus, which can optimize the size of a memory used for an operation of firmware by managing variable data of the firmware, which may vary depending on an operation of a memory system, using a runtime overlay scheme.

Technical objects to be achieved in the disclosure are not limited to the aforementioned technical objects, and other technical objects not described above may be evidently understood by a person having ordinary skill in the art to which the disclosure pertains from the following description.

In accordance with an embodiment of the present invention, a memory system may include: a non-volatile memory device suitable for storing firmware; a volatile memory device comprising a write cache region for temporarily storing write data to be programmed into the non-volatile memory device and a firmware cache region for loading the firmware from the non-volatile memory device; and a controller suitable for: moving, to the write cache region, changeable firmware data that is generated or modified in the firmware cache region during an operation of the controller; programming the changeable firmware data, after it is moved into the write cache region, into the non-volatile memory device; and generating, in the firmware cache region, access information of the changeable firmware data.

The access information in the controller may include first location information indicating whether the changeable firmware data is stored in the write cache region or the non-volatile memory device.

The access information may further include a physical address indicating the location into which the changeable firmware data is programmed in the non-volatile memory device, as second location information.

The controller may be further suitable for deleting, from the write cache region, the changeable firmware data after the programming is completed.

The controller may be further suitable for moving, in response to an access request for the changeable firmware data, the changeable firmware data from the write cache region to the firmware cache region when it is determined that the changeable firmware data has been cached in the write cache region according to the first location information.

The controller may be further suitable for moving, in response to an access request for the changeable firmware data, the changeable firmware data from the non-volatile memory device to the firmware cache region according to the second location information when it is determined that the changeable firmware data has been programmed in the non-volatile memory device according to the first location information.

The changeable firmware data may include first and second changeable firmware data, and the controller may be further suitable for: classifying the variable firmware data into first changeable firmware data having a relatively high weight and second changeable firmware data having a relatively low weight, and preferentially loading the first changeable firmware data into the firmware cache region.

The controller may be further suitable for: programming, into the non-volatile memory device, a piece of the first changeable firmware data loaded into the firmware cache region to secure a space within the firmware cache region; loading, into the secured space, a piece of the second changeable firmware data from the non-volatile memory device, the piece of the second changeable firmware data being access-requested; and generating relation information in the firmware cache region, the relation information relating to the piece of the second changeable firmware data and the piece of the first changeable firmware data.

The controller may be further suitable for: programming, upon completion of servicing the access request for the piece of the second changeable firmware data, the piece of the second changeable firmware data into the non-volatile memory device; loading the piece of the first changeable firmware data into the firmware cache region using the relation information; and deleting the relation information.

The first changeable firmware data may be used in at least one of a read operation, a program operation, an erase operation and a map update operation, and the second changeable firmware data may be used in at least one of a boot operation and a background operation.

In accordance with an embodiment of the present invention, an operating method of a memory system, comprising a non-volatile memory device suitable for storing firmware and a volatile memory device comprising a write cache region for temporarily storing write data to be programmed into the non-volatile memory device and a firmware cache region for loading the firmware from the non-volatile memory device, the operating method may include: moving, to the write cache region, changeable firmware data that is generated or modified in the firmware cache region during an operation of the controller; programming the changeable firmware data, after it is moved into the write cache region, into the non-volatile memory device; and generating, in the firmware cache region, access information of the changeable firmware data.

The access information may include: first location information indicating whether the changeable firmware data is stored in the write cache region or the non-volatile memory device; and a physical address indicating a location, into which the changeable firmware data is programmed in the non-volatile memory device, as second location information.

The operating method may further include deleting, from the write cache region, the changeable firmware data after the programming.

The operating method may further include moving, in response to an access request for the changeable firmware data, the changeable firmware data from the write cache region to the firmware cache region when it is determined that the changeable firmware data is cached in the write cache region according to the first location information.

The operating method may further include moving, in response to an access request for the changeable firmware data, the changeable firmware data from the non-volatile memory device to the firmware cache region according to the second location information when it is determined that the changeable firmware data is programmed in the non-volatile memory device according to the first location information.

The operating method may further include: classifying the changeable firmware data into first changeable firmware data having a relatively high weight and second changeable firmware data having a relatively low weight, and preferentially loading the first changeable firmware data into the firmware cache region.

The operating method may further include: programming, into the non-volatile memory device, a piece of the first changeable firmware data loaded into the firmware cache region to secure a space within the firmware cache region; loading, into the secured space, a piece of the second changeable firmware data from the non-volatile memory device, the piece of second changeable firmware data being access-requested; and generating relation information in the firmware cache region, the relation information relating to the piece of the second changeable firmware data and the piece of the first changeable firmware data.

The operating method may further include: programming, upon completion of servicing the access request for the piece of the second changeable firmware data, the piece of the second changeable firmware data into the non-volatile memory device; loading the piece of the first changeable firmware data into the firmware cache region using the relation information; and deleting the relation information.

The first changeable firmware data may be used in at least one of a read operation, a program operation, an erase operation and a map update operation, and the second changeable firmware data may be used in at least any one of a boot operation and a background operation.

In accordance with an embodiment of the present invention, a memory system may include: a nonvolatile memory device suitable for storing plural pieces of changeable firmware data; a first cache suitable for caching one or more pieces among the plural pieces of changeable firmware data in a runtime-overlay manner; a second cache; and a controller suitable for: changing the one or more pieces cached in the first cache for use in an operation of the nonvolatile memory device; moving the one or more pieces from the first cache to the second cache; controlling the nonvolatile memory device to move the one or more pieces from the second cache to the nonvolatile memory device; generating location information indicating whether the one or more pieces are stored in the second cache or the nonvolatile memory device; and moving, in response to an access request for a piece that is cache-missed in the first cache, from the second cache or the nonvolatile memory device to the first cache according to the location information.

DETAILED DESCRIPTION

Figure 1:
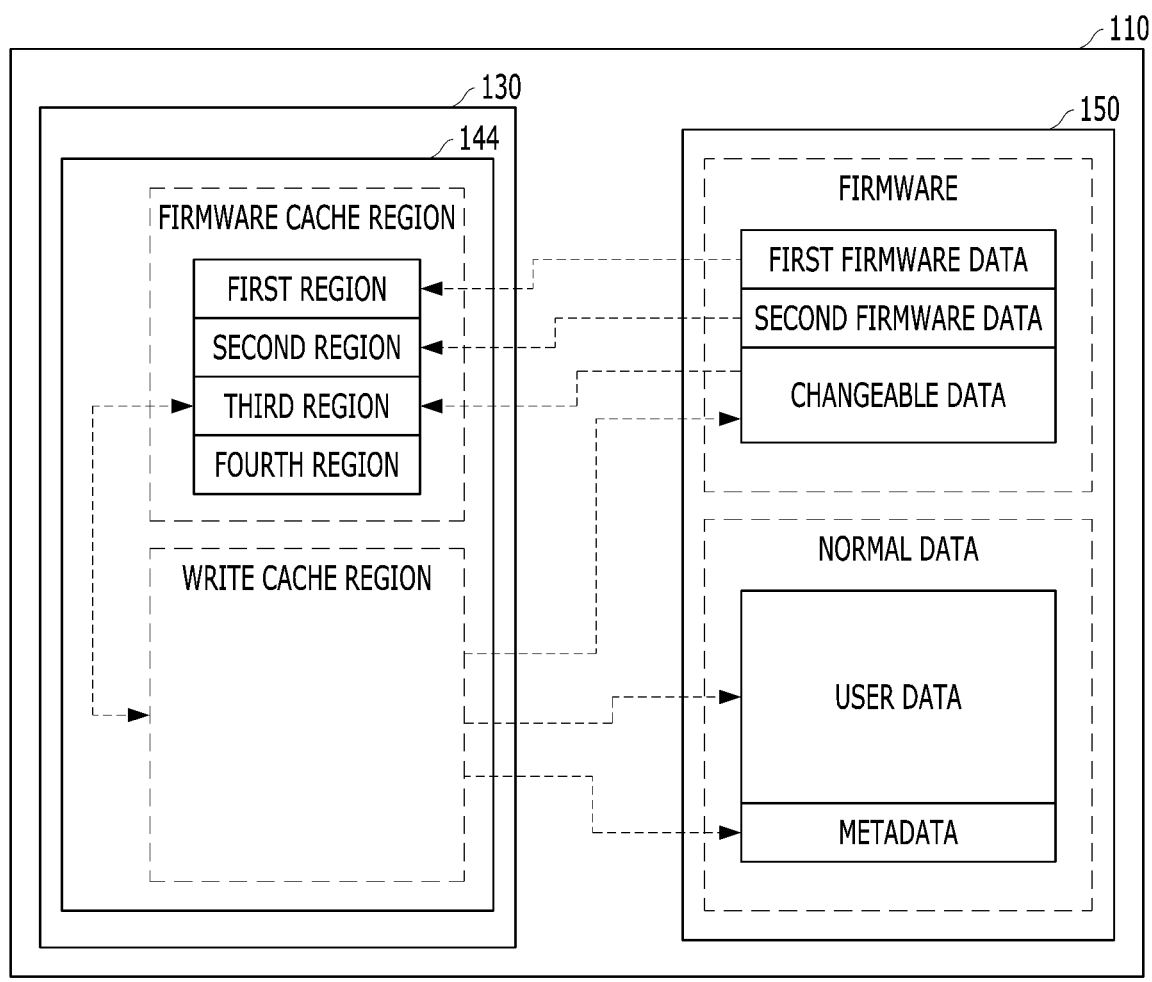
FIG. 1 illustrates a memory system according to various embodiments.

Various examples of the disclosure are described below in more detail with reference to the accompanying drawings. Aspects and features of the present invention, however, may be embodied in different ways to form other embodiments, including variations of any of the disclosed embodiments. Thus, the invention is not limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 illustrates a memory system 110 according to various embodiments.

Figure 2:
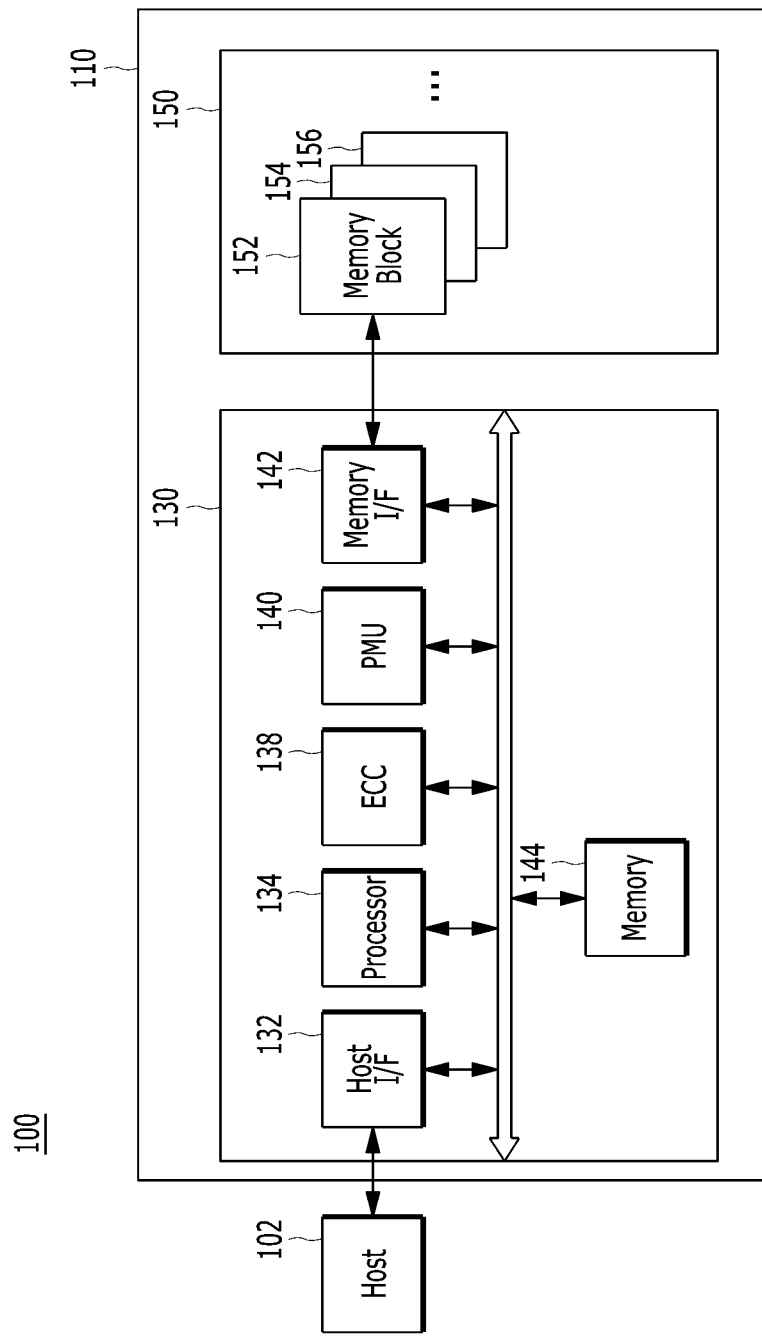
FIG. 2 illustrates an example of a data processing system including the memory system according to various embodiments.

For example, the memory system 110 may be mounted on a computing apparatus or a mobile apparatus, and may transmit and receive data while operating in conjunction with a host 102 (shown in FIG. 2).

Referring to FIG. 1, the memory system 110 includes a controller 130 and a memory device 150. Furthermore, the controller 130 may include a memory 144.

The controller 130 may perform a read operation of outputting, from the memory device 150, data requested by the host 102 or data to be used within the memory system 110, a program operation of storing, in the memory device 150, data transmitted by the host 102 or data generated within the memory system 110, and an erase operation of erasing data stored in the memory device 150. The memory device 150 may include a plurality of blocks, each one including multiple cells capable of storing data. The memory device 150 may be configured in different ways depending on a characteristic of the memory device 150, the purpose of use of the memory system 110 or the specifications of the memory system 110 necessary for the host 102. For example, different configurations may use memory cells with different storage capacities.

For example, the memory 144 is a volatile memory device, and may be implemented as a static RAM (SRAM) or a dynamic RAM (DRAM). Furthermore, the memory device 150 is a non-volatile memory device, and may be implemented as a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 150 may be implemented in the form of a three-dimensional array structure. Various embodiments may also be applied to a charge trap flash (CTF) in which a charge storage layer is configured with a dielectric layer, in addition to a flash memory device in which a charge storage layer is configured with a conductive floating gate.

The memory device 150 is configured to receive a command and an address from the controller 130 and to access a region that belongs to a memory cell array and that is selected by an address. That is, the memory device 150 may perform an operation, corresponding to the command, on the region selected by the address.

For example, the memory device 150 may execute a program operation, a read operation and an erase operation. In relation to such operations, the memory device 150 may program data into a region selected by an address when performing a program operation. The memory device 150 may read data from a region selected by an address when performing a read operation. The memory device 150 may erase data stored in a region selected by an address when performing an erase operation.

The controller 130 may control an operation of the memory device 150 in response to a request from the host 102 or in the absence of a request from the host 102.

For example, the controller 130 may control a write (program), read, erase or background operation of the memory device 150. In this case, the background operation may be a garbage collection (GC), wear leveling (WL), or bad block management (BBM) operation, for example.

The controller 130 may control an operation of the memory system 110 by executing firmware. In other words, the controller 130 may control overall operation of the memory device 150. In order to execute a logical operation, the controller 130 may load the firmware into the memory 144 upon booting and may execute (or drive) the firmware. For example, the firmware may be stored in the memory device 150 and then loaded into the memory 144.

The firmware is a program executed within the memory system 110. For example, the firmware may include a flash translation layer (FTL) having a translation function between a logical address, requested from the memory system 110 by the host, and a physical address of the memory device 150, a host interface layer (HIL) serving to interpret a command requested from the memory system 110, that is, a storage device, by the host 102 and transmit the command to the FTL, and a flash interface layer (FIL) for transmitting a command, indicated by the FTL, to the memory device 150.

The memory 144 may include a firmware cache region and a data cache region. In this case, the firmware cache region of the memory 144 may be used to load the firmware stored in the memory device 150. Furthermore, the data cache region of the memory 144 may be used to temporarily store data that is transmitted in response to a request from the host 102 or by an internal operation of the controller 130. In particular, a write cache region of the data cache region may be used to temporarily store write data programmed into the memory device 150 in response to a request from the host 102 or by an internal operation of the controller 130.

The firmware is stored in the memory device 150. In order for the controller 130 to drive the firmware, the firmware stored in the memory device 150 needs to be loaded into the memory 144 within the controller 130.

In order for the entire, i.e., all of the, firmware to be loaded into the memory 144, the storage capacity of the memory 144 needs to be greater than the full size of the firmware. In this case, there may be a problem in that costs for the memory 144 rise as the size of the firmware increases.

As illustrated, the firmware may include multiple pieces of firmware data, for example, first firmware data, second firmware data and variable (or changeable) firmware data. Furthermore, the controller 130 may load only a portion of the firmware data, i.e., only some of the multiple pieces of firmware data, into the memory 144. In this case, costs for the memory 144 can be reduced because the memory 144 does not need to have a storage capacity greater than the full size of the firmware in order to drive the firmware.

If only some of the multiple pieces of firmware data in the firmware is dynamically loaded into the memory 144 during runtime, costs for the memory 144 can be reduced because the memory 144 can be efficiently used. Such a scheme may be referred to as a runtime overlay scheme.

If the runtime overlay scheme is used, overhead may occur in a process of loading part (e.g., the changeable firmware data) of the firmware from the memory device 150 to the memory 144, a process of executing the loaded firmware data, and a process of writing the changeable firmware data, which has changed, back to the memory device 150. For example, in a garbage collection (GC) operation, lists of target blocks and source blocks may change during runtime and thus may be changeable firmware data.

Accordingly, in various embodiments, in order to minimize overhead which may occur while the runtime overlay scheme is used, the runtime overlay scheme may be used for only a portion of the firmware, e.g., only certain pieces of the firmware.

That is, in various embodiments, a portion of firmware data critical to operation performance may be set as firmware data that is not used in runtime overlay (non-runtime overlay firmware data).

The runtime overlay scheme is not applied to non-runtime overlay firmware data, and such firmware cannot be partially loaded in a runtime manner. Rather, non-runtime overlay firmware data should be loaded as a whole into the memory 144 to run it.

An example of data critical to operation performance may include data that is very frequently called by the controller 130, such as data to execute a read operation, data to execute a program operation, and data to execute a map update operation.

In contrast, firmware data not critical to operation performance and which is allowed to be generated or modified during an operation of the controller 130 may be set as firmware data of runtime-overlay.

Runtime-overlay firmware data may be loaded into the memory 144 in runtime.

An example of data not critical to operation performance may include data that is called by the controller 130 with low frequency, such as data to execute a boot operation and data to execute a background operation (e.g., a garbage collection (GC) operation, a wear leveling (WL) operation, a map flush operation, or a read reclaim (RR) operation).

Examples of changeable firmware data that is allowed to be generated or modified during an operation of the controller 130 may include data that is used in a process of executing a read operation, program operation or map update operation and data that is used in a process of executing a boot operation or a background operation.

For example, the first firmware data may be non-runtime-overlay firmware while the second firmware data and changeable firmware data may be of the runtime-overlay type. On the other hand, the first firmware data and the second firmware data may be unchangeable firmware data while the changeable firmware data may be allowed to be generated or modified in runtime during an operation of the controller 130, such as a foreground operation which may be a read operation, a write operation or a background operation, e.g., a GC operation or a WL operation.

The first firmware data and the second firmware data once loaded onto the memory 144 do not need to be written back to the memory device 150 since first firmware data and the second firmware data are unchangeable firmware data that are not allowed to be generated or modified in runtime during an operation of the controller 130 and thus the versions thereof stored in the memory device 150 and loaded onto the memory 144 are the same.

The second firmware data of the runtime-overlay type may be loaded in the memory 144 by overwriting piece on the memory 144.

There may occur a situation in which changeable firmware data loaded in the memory 144 in runtime is generated or modified during an operation of the memory system 110. Accordingly, the changeable firmware data that is changed may need to be written back to the memory device 150. For example, when other firmware data is requested to be loaded to the memory 144 at a time at which the memory 144 is running out of firmware cache region and the changeable firmware data currently loaded in the memory 144 is changed, the other firmware data should wait to be loaded into the firmware cache region until the changeable firmware data currently loaded therein, which has changed, is written back to the memory device 150.

In this case, the operation speed of the memory device 150 implemented as a non-volatile memory device may be slower than the operation speed of the memory 144 implemented as a volatile memory device. Accordingly, the waiting time for the other firmware data to be loaded into the firmware cache region within the memory 144 until the changeable firmware data currently loaded therein, which has changed, is written back to the memory device 150 may cause significant degradation in the performance of the memory system 110.

For this reason, in various embodiments, when it is necessary to write changeable firmware data, which is currently loaded into the firmware cache region of the memory 144, back in the memory device 150, the changeable firmware data may be moved from the firmware cache region to the write cache region of the memory 144. That is, memory space may be secured in the firmware cache region for other firmware data to be loaded therein. The changeable firmware data moved to the write cache region may be written back in the memory device 150.

In this case, the write cache region of the memory 144 serves to temporarily store data written in the memory device 150 in response to a request from the host 102 or by an internal operation of the controller 130, for example, user data or metadata. Accordingly, the write cache region of the memory 144 may be assigned a relatively larger space compared to the firmware cache region. In general, in terms of the characteristic of a write operation that requires very long latency, a minimum amount of unused space, i.e., (marginal space) may be always available in the write cache region. Furthermore, data movement between the write cache region and the firmware cache region may be performed relatively faster than data movement to a non-volatile memory device because both the write cache region and the firmware cache region are in the memory 144, which is implemented as a volatile memory device having faster operation speed than the non-volatile memory device.

FIG. 2 illustrates a data processing system including a memory system according to an embodiment of the disclosure. Referring to FIG. 2, the data processing system 100 may include a host 102 engaged or operably coupled with a memory system 110.

The host 102 may be implemented in part or in whole, for example, by any of a variety of portable electronic devices, such as a mobile phone, an MP3 player and a laptop computer, or an electronic device such as a desktop computer, a game player, a television (TV), a projector and the like.

The host 102 includes at least one operating system (OS), which can generally manage, and control, functions and operations performed in the host 102. The OS may provide interoperability between the host 102 engaged with the memory system 110 and the user of the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. The enterprise operating systems may be specialized for securing and supporting high performance, including Windows servers, Linux and Unix. Further, the mobile operating system may include an Android, an iOS and a Windows mobile. The mobile operating system may be subject to support services or functions for mobility (e.g., a power saving function). The host 102 may execute multiple operating systems in cooperation with the memory system 110, corresponding to a user's request. The host 102 may transmit a plurality of commands corresponding to user requests to the memory system 110, thereby causing operations corresponding to commands to be performed within the memory system 110. Handling plural commands in the memory system 110 is described below with reference to FIGS. 4 and 5.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented by any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented by a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be any of the various types of memory systems as exemplified above.

By way of example but not limitation, the controller 130 and the memory device 150 may be integrated into a single semiconductor device to form an SSD for improving operation speed. When the memory system 110 is used as an SSD, the operating speed of the host 102 connected to the memory system 110 can be improved more than that of the host 102 connected with a hard disk. In another embodiment, the controller 130 and the memory device 150 may be integrated into one semiconductor device to form a memory card, such as a PC card (PCMCIA), a compact flash card (CF), a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device that retains data stored therein even while electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 may also include a plurality of memory dies, each of which includes a plurality of planes, each of which includes memory blocks, among the plurality of memory blocks 152, 154, 156. In addition, the memory device 150 may be a non-volatile memory device, for example a flash memory, wherein the flash memory may be a three-dimensional stack structure.

The controller 130 may control operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, error correction code (ECC) circuitry 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and/or integrated drive electronics (IDE). In accordance with an embodiment, the host interface 132 serves to exchange data with the host 102. The host interface 132 may be implemented through firmware called a host interface layer (HIL).

The ECC circuitry 138 may correct error bits of the data to be processed in and outputted from the memory device 150, which may include an ECC encoder and an ECC decoder. Here, the ECC encoder may perform error correction encoding of data to be programmed in the memory device 150 to generate encoded data into which a parity bit is added and store the encoded data in memory device 150. The ECC decoder may detect and correct errors contained in a data read from the memory device 150 when the controller 130 reads the data stored in the memory device 150. After performing error correction decoding on the data read from the memory device 150, the ECC circuitry 138 may determine whether the error correction decoding has succeeded and output an instruction signal (e.g., a correction success signal or a correction fail signal). The ECC circuitry 138 may use the parity bit which is generated during the ECC encoding process for correcting error bit(s) of the read data. When the number of error bits is greater than or equal to a threshold number of correctable error bits, the ECC circuitry 138 may not correct the error bits but instead may output an error correction fail signal.

The ECC circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC circuitry 138 may include any and all circuits, modules, systems or devices for performing the error correction operation based on at least one of the above described codes.

The PMU 140 may manage electrical power provided in the controller 130. For example, the PMU 140 may detect power-on and power-off. In addition, the PMU 140 may include a power detector.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a flash interface layer (FIL), which functions as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented by a volatile memory. The memory 144 may be implemented by a static random access memory (SRAM), a dynamic random access memory (DRAM) or both. Although FIG. 1 exemplifies the memory 144 disposed within the controller 130, the present invention is not limited to that arrangement. That is, the memory 144 may be within or disposed externally to the controller 130. For instance, the memory 144 may be embodied by an external volatile memory having a memory interface transferring data and/or signals between the memory 144 and the controller 130.

The memory 144 may store data for performing operations such as data writing and data reading requested by the host 102 and/or data transfer between the memory device 150 and the controller 130 for background operations such as garbage collection and wear levelling as described above. For such data storage, the memory 144 may include a program memory, a data memory, a write buffer/cache, a read buffer/cache, a data buffer/cache, a map buffer/cache, and a firmware cache region, such as that described with reference to FIG. 1.

The processor 134 may be implemented with a microprocessor or a central processing unit (CPU). The memory system 110 may include one or more processors 134.

Furthermore, the processor 134 may be designed using a specific architecture.

For example, the processor 134 may be designed using an ARM Cortex-M architecture optimized to implement a micro controller unit (MCU), although the processor 134 of the present invention is not limited to this architecture.

The ARM Cortext-M architecture uses a 32-bit memory address system.

The ARM Cortex-M architecture supports ARM Thumb instructions, but may be extended to support both 16-bit and 32-bit instructions defined as a Thumb-2 instruction set.

Furthermore, in the ARM Cortex-M architecture, interrupt handling may be managed by an embedded interrupt controller called a nested vectored interrupt controller (NVIC). The embedded interrupt controller may perform automatic priority assignment, nesting and masking functions other than an interrupt and a system.

Furthermore, the ARM Cortex-M architecture may support a memory protection unit (MPU) capable of segmenting and managing a memory space.

The ARM Cortex-M architecture is a non-mapping-based architecture for a memory address. The non-mapping-based architecture means an architecture in which a memory management unit (MMU) providing a mapping function between a logical memory address and a physical memory address is not used. If the MMU is not used, a logical memory address and a physical memory address may be identically set.

For reference, if the processor 134 uses the ARM Cortex-M architecture, the memory 144 may be a tightly coupled memory (TCM). As noted above, this specific architecture is merely an example. The processor 134 may be configured with other suitable architectures consistent with the teachings herein.

Furthermore, the processor 134 may control overall operation of the memory system 110. By way of example but not limitation, the processor 134 can control a program operation or a read operation of the memory device 150, in response to a write request or a read request entered from the host 102. In accordance with an embodiment, the processor 134 may use or execute firmware to control overall operation of the memory system 110. Herein, the firmware may be a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is received from the host 102, with a physical address of the memory device 150 through the map data. The memory device 150 may otherwise function as a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the particular page to the newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 may handle instructions or commands corresponding to an inputted command from the host 102. The controller 130 may perform a foreground operation, as a command operation, corresponding to an command from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data in a memory block, among the memory blocks 152, 154, 156, and storing such data in another memory block (e.g., a garbage collection (GC) operation). The background operation may include an operation to move data stored in at least one of the memory blocks 152, 154, 156 in the memory device 150, into at least another of the memory blocks 152, 154, 156 (e.g., a wear leveling (WL) operation). During a background operation, the controller 130 may use the processor 134 for storing the map data stored in the controller 130 to at least one of the memory blocks 152, 154, 156, e.g., a map flush operation. A bad block management operation of checking for bad blocks among the plurality of memory blocks 152, 154, 156 is another example of a background operation performed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) for connecting the controller 130 to which memory die(s) in the memory 150 is/are proper or appropriate for performing each operation. The controller 130 may send or transmit data or instructions via the determined channel(s) or way(s) for performing each operation. The plurality of memory dies may transmit an operation result via the same channel(s) or way(s), respectively, after each operation is complete. Then, the controller 130 may transmit a response or an acknowledge signal to the host 102. In an embodiment, the controller 130 may check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 may recognize statuses of channels (or ways) associated with memory dies in the memory device 150. The controller 130 may determine whether each channel or each way is in a busy state, a ready state, an active state, an idle state, a normal state, or an abnormal state. The controller's determination of which channel or way an instruction (and/or a data) is to be delivered through can be based on a physical block address, e.g., to which die(s) the instruction (and/or the data) is to be delivered. The controller 130 may refer to descriptors delivered from the memory device 150. The descriptors may include a block or page of parameters that describe informative items about the route and destination of the instruction(s)/data to be delivered. The parameters may be data with a set format or structure. For instance, the descriptors may include device descriptors, configuration descriptors, unit descriptors, and the like. The controller 130 can refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
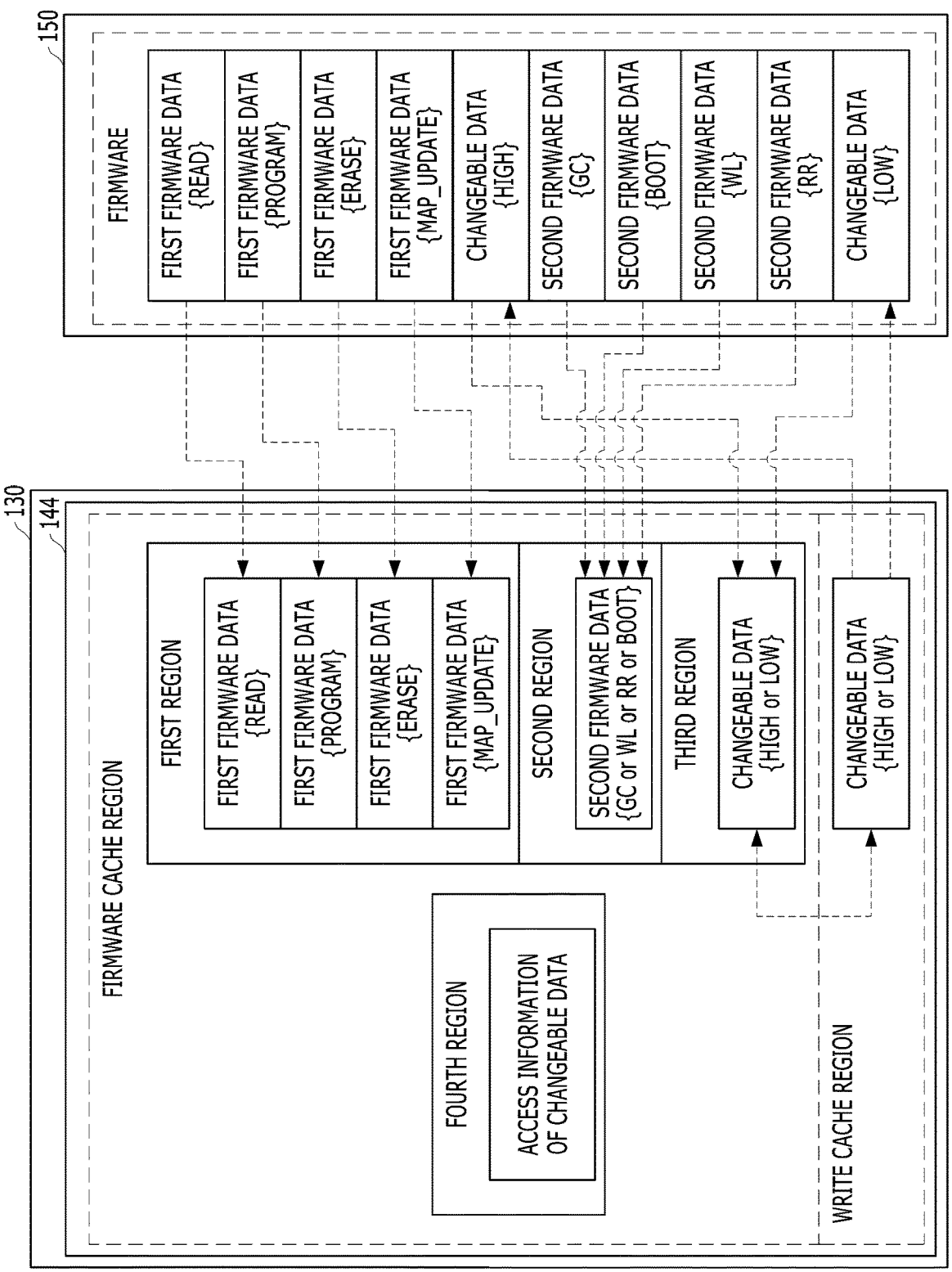
FIG. 3 illustrates the structure of firmware and a method of loading the firmware according to various embodiments.

FIG. 3 illustrates a structure of firmware and a method of loading the firmware according to various embodiments.

Referring to FIG. 3, the firmware is stored in the memory device 150. In order for the controller 130 to drive the firmware, the firmware stored in the memory device 150 needs to be loaded into the memory 144 within the controller 130.

In this case, the firmware stored in the memory device 150 may include first firmware data, second firmware data and changeable firmware data. Furthermore, the first firmware data may include firmware data {READ} to execute a read operation, firmware data {PROGRAM} to execute program data, firmware data {ERASE} to execute an erase operation, and firmware data {MAP_UPDATE} to execute a map update operation. Furthermore, the second firmware data may include firmware data {GC} to execute a GC operation, firmware data {BOOT} to execute a boot operation, firmware data {WL} to execute a WL operation, and firmware data {RR} to execute an RR operation. Furthermore, the changeable firmware data may include first changeable firmware data {HIGH} which may be used for an operation corresponding to the first firmware data and second changeable firmware data {LOW} which may be used for an operation corresponding to the second firmware data.

Furthermore, the first firmware data may be loaded into a first region of the firmware cache region of the memory 144. Furthermore, the second firmware data may be loaded into a second region of the firmware cache region of the memory 144. Furthermore, the changeable firmware data may be loaded into a third region of the firmware cache region of the memory 144.

Furthermore, as illustrated in FIG. 1, the first firmware data may be of the non-runtime-overlay type, while the second firmware data and the changeable firmware data may be of runtime-overlay type. On the other hand, the first firmware data and the second firmware data may be unchangeable firmware data, that is, firmware that is not allowed to be generated or modified in runtime during an operation of the controller 130, while the changeable firmware data may be generated or modified during an operation of the controller 130. The operation of the controller 130 may be a foreground operation including a read operation or a write operation or a background operation, e.g., a GC operation or a WL operation.

Accordingly, the entire first firmware data stored in the memory device 150 may be loaded into the first region without any change. That is, all of the firmware data {READ} to execute a read operation, the firmware data {PROGRAM} to execute a program operation, the firmware data {ERASE} to execute an erase operation, and the firmware data {MAP_UPDATE} to execute a map update operation, which are included in the first firmware data, may be loaded into the first region without any change.

Furthermore, part of the second firmware data stored in the memory device 150 may be selected and loaded into the second region in runtime. That is, any of the firmware data {GC} to execute a GC operation, the firmware data {BOOT} to execute a boot operation, the firmware data {WL} to execute a WL operation, and the firmware data {RR} to execute an RR operation, each of which is a part of the second firmware data, may be selected and loaded into the second region in runtime.

Furthermore, a part of the changeable firmware data stored in the memory device 150 may be selected and loaded into the third region in a runtime manner. That is, any of the first changeable firmware data {HIGH} and second changeable firmware data {LOW}, which are parts of the changeable firmware data, may be selected and loaded into the third region in runtime. In this case, the state before the changeable firmware data is updated by an internal operation of the controller 130 may be defined as a first state $\{1^{ST}\_STATE\}$. The state after the changeable firmware data is updated by an internal operation of the controller 130 may be defined as a second state $\{2^{ND}\_STATE\}$.

The first firmware data and the second firmware data once loaded into the memory 144 do not need to be written back in the memory device 150 since both are unchangeable firmware data that are not allowed to be generated or modified in runtime during an operation of the controller 130.

As described above, the changeable firmware data loaded in the memory 144 may be written back in the memory device 150. When the changeable firmware data loaded in the memory 144 is written back in the memory device 150, the changeable firmware data may be moved from the firmware cache region to the write cache region and then written from the write cache region into the memory device 150. After the changeable firmware data is loaded in the memory 144 or cached in the write cache region or stored in the memory device 150, the state before the changeable firmware data is updated by an internal operation of the controller 130 may be defined as the first state $\{1^{ST}\_STATE\}$.

The controller 130 may store access information of the changeable firmware data in a fourth region of the memory 144.

The access information of the changeable firmware data may include first location information indicating location of the changeable firmware data, the location being the write cache region or the memory device 150. During the process of writing the changeable firmware data back to the memory device 150, the changeable firmware data may be moved from the firmware cache region to the write cache region of the memory 144 and then the first location information may indicate that the changeable firmware data is in the write cache region. Then, when the changeable firmware data cached in the write cache region is written back into the memory device 150, the first location information may be updated to indicate the memory device 150 as the location of the changeable firmware data.

Furthermore, upon completion of writing back the changeable firmware data into the memory device 150, the changeable firmware data may be removed from the write cache region.

Furthermore, the access information of the changeable firmware data may include second location information, which may include a physical address, indicating a storage location within the memory device 150. The physical address may indicate a location into which the changeable firmware data is programmed in the memory device 150 upon completion of writing back the specific changeable firmware data from the write cache region to the memory device 150.

After the changeable firmware data is moved from the firmware cache region to the write cache region, in the course of writing the changeable firmware data back in the memory device 150, an access request for the changeable firmware data may be made. In response to that access request, the controller 130 may refer to the first location information of the access information stored in the fourth region of the memory 144 and may identify the write cache region or the memory device 150 as the location of the changeable firmware data.

In referring to the first location information, it may be determined that the changeable firmware data is cached in the write cache region and thus the controller 130 may move the access-requested changeable firmware data back from the write cache region to the firmware cache region. Then, the controller 130 may access the changeable firmware data currently cached back in the firmware cache region in response to the access request for the firmware cache region.

In referring to the first location information, it may be determined that the changeable firmware data has been written back into the memory device 150, and thus the changeable firmware data may be removed from the write cache region. In this case, the controller 130 may refer to the second location information of the access information stored in the fourth region of the memory 144 to locate the changeable firmware data stored in the memory device 150. Then, the controller 130 may load the access-requested changeable firmware data back from the memory device 150 to the firmware cache region. Then, the controller 130 may access the changeable firmware data currently cached back in the firmware cache region in response to the access request for the firmware cache region.

In an embodiment, the first changeable firmware data {HIGH} may be used for an operation based on the first firmware data and may have a relatively higher weight than the second changeable firmware data {LOW} which may be used for an operation based on the second firmware data. When the changeable firmware data is classified based on the weight as described above, the controller 130 may preferentially load the first changeable firmware data {HIGH} into the firmware cache region.

For example, if multiple pieces of first changeable firmware data {HIGH} and multiple pieces of second changeable firmware data {LOW} of the changeable firmware data are stored in the memory device 150, the controller 130 may preferentially select the multiple pieces of first changeable firmware data {HIGH}, may load the multiple pieces of first changeable firmware data {HIGH} into the firmware cache region, and may selectively load the multiple pieces of second changeable firmware data {LOW} into the firmware cache region only if an access request is present.

When the firmware cache region is full with first changeable firmware data {HIGH} and there is a need to load specific second changeable firmware data {LOW} into the firmware cache region, the controller 130 may write back to the memory device 150 a part or some of the first changeable firmware data {HIGH} to free memory space within the firmware cache region and load the required second changeable firmware data {LOW} into freed memory space in the firmware cache region. In such a case, the controller 130 may store, in the fourth region in the firmware cache region, relation information of the written-back first changeable firmware data {HIGH} and the required second changeable firmware data {LOW} loaded into the secured memory space in the firmware cache region.

Then, when the loaded second changeable firmware data {LOW} is no longer required, the controller 130 may write back to the memory device 150 the second changeable firmware data {LOW} to free memory space in the firmware cache region and load back into the freed memory space in the firmware cache region the first changeable firmware data {HIGH} by referring to the relation information cached in the firmware cache region, and may then delete the relation information.

Figure 4A:
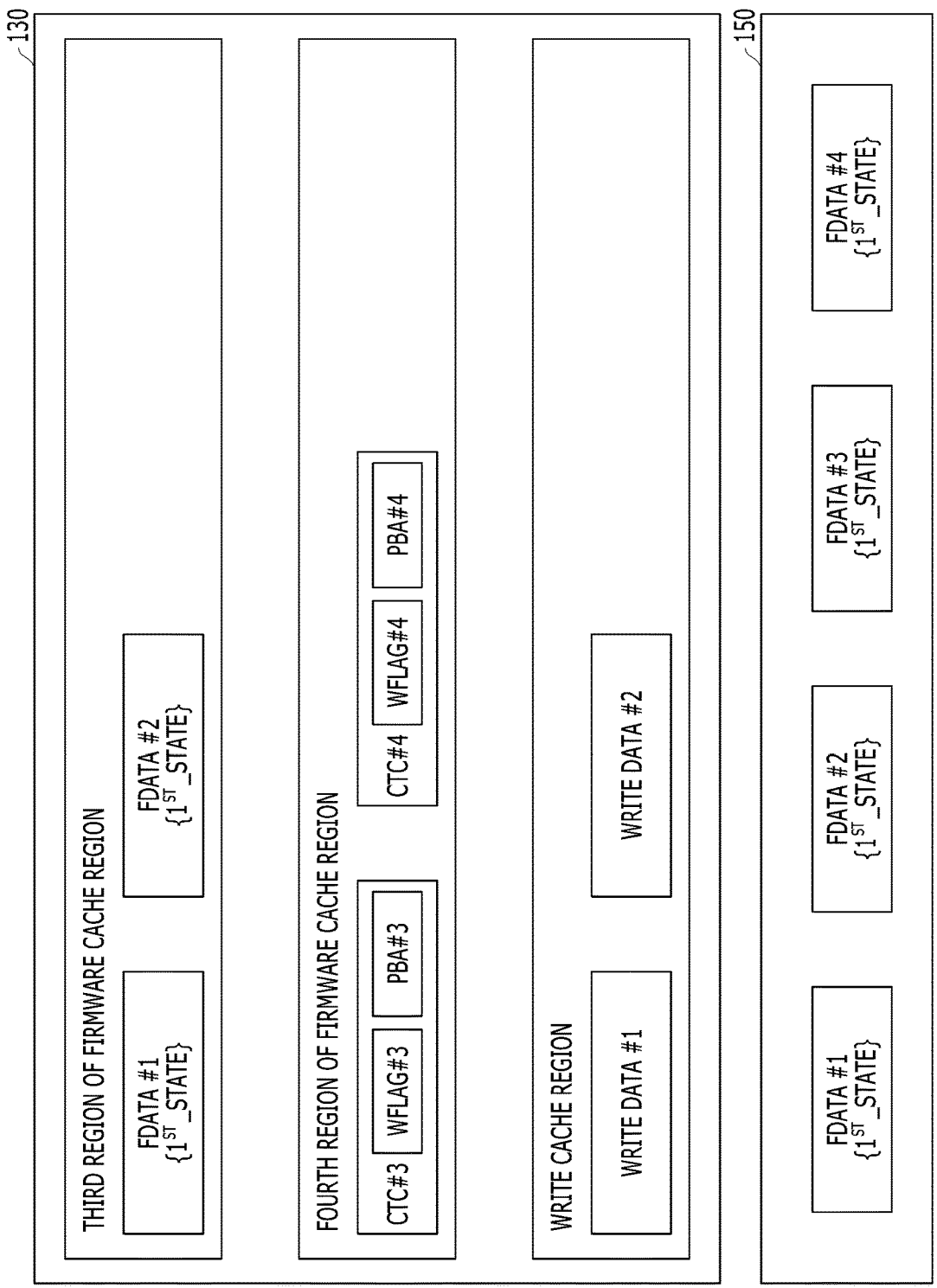
FIGS. 4A to 4C illustrate a first example of a firmware management operation.
Figure 4B:
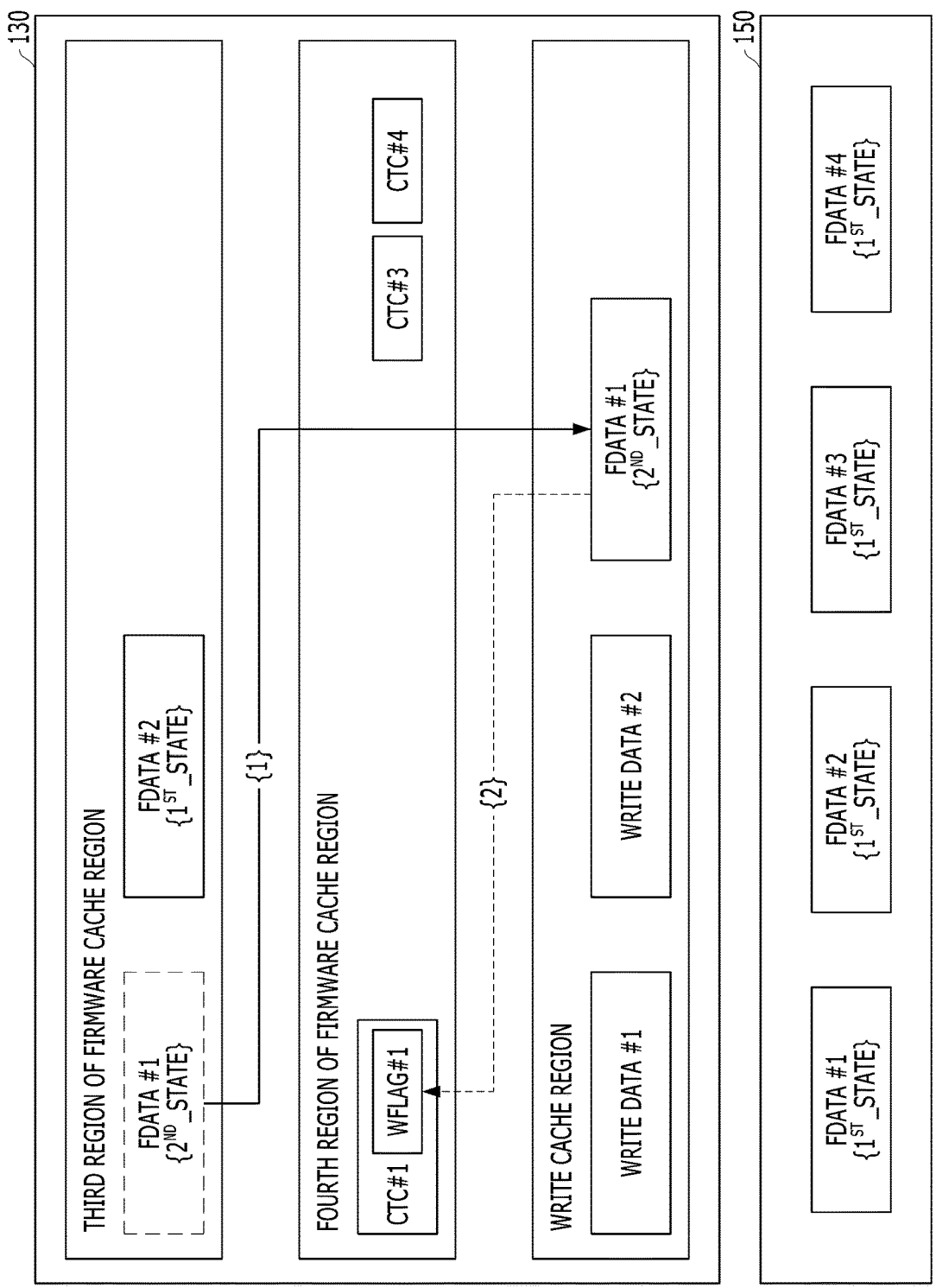
Figure 4C:
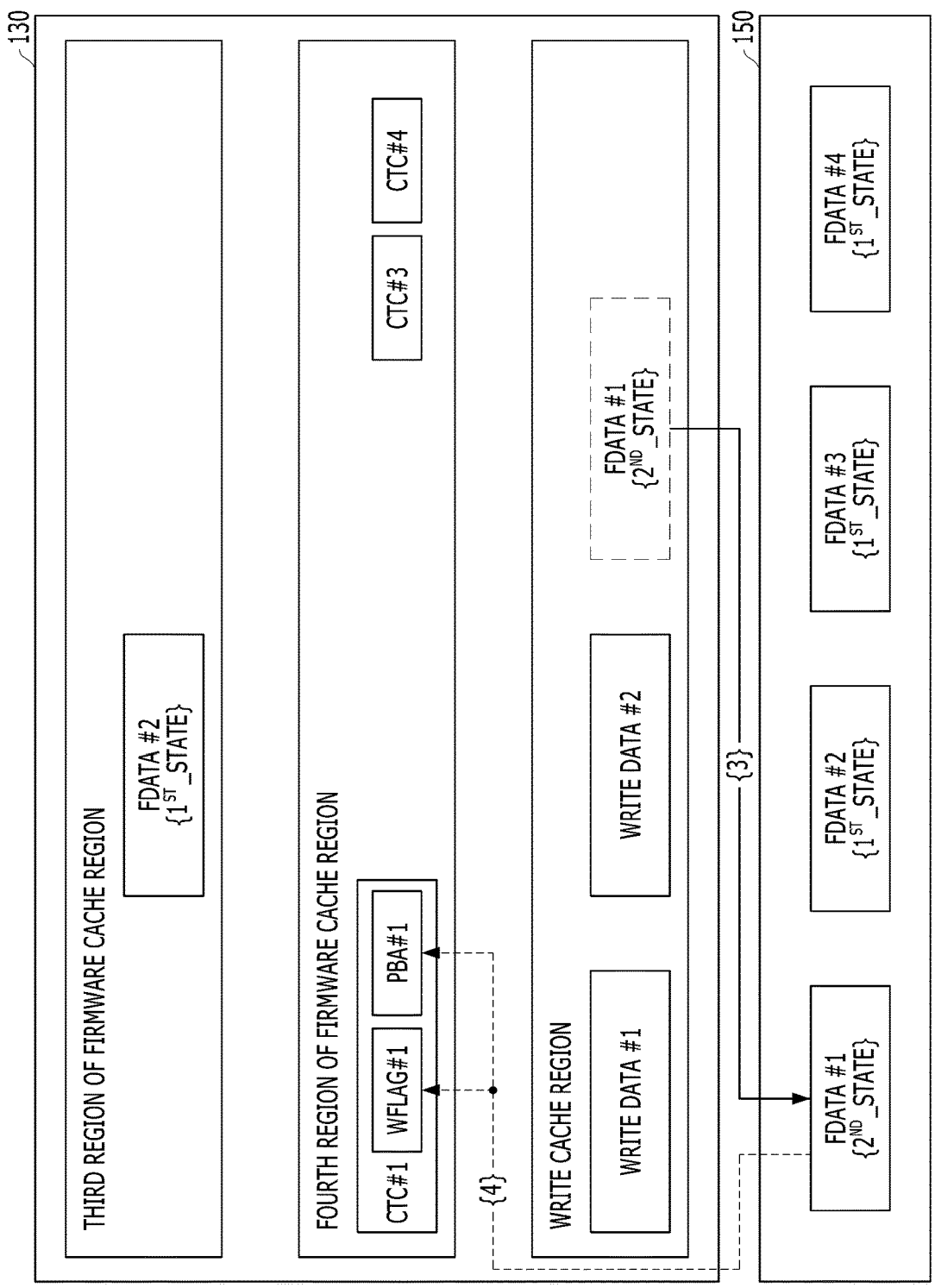

FIGS. 4A to 4C illustrate a first example of a firmware management operation.

FIGS. 4A to 4C illustrates the first example of the firmware management operation of the controller 130 in which changeable firmware data loaded into the firmware cache region is written in the memory device 150 via the write cache region according to various embodiments described with reference to FIGS. 1 to 3.

First, referring to FIG. 4A, in the illustrated example there are four pieces of changeable firmware data.

All of the four pieces of changeable firmware data, i.e., FDATA #1, FDATA #2, FDATA #3, and FDATA #4, may be stored in the memory device 150. At this time, it may be seen that each of FDATA #1, FDATA #2, FDATA #3, and FDATA #4 stored in the memory device 150 is in the first state $\{1^{ST}\_STATE\}$.

Furthermore, it is exemplified that two pieces of changeable firmware data, i.e., FDATA #1 and FDATA #2, of the four pieces of changeable firmware data have been loaded into the third region of the firmware cache region in the memory 144. Each of FDATA #1 and FDATA #2 loaded into the firmware cache region is in the first state $\{1^{ST}\_STATE\}$. In addition to both being in the first state $\{1^{ST}\_STATE\}$, FDATA #1 and FDATA #2 may be the same.

Furthermore, the other two pieces of changeable firmware data, i.e., FDATA #3 and FDATA #4, stored in the memory device 150 only, have not been loaded into the firmware cache region. Accordingly, two pieces of access information CTC #3 and CTC #4 corresponding to FDATA #3 and FDATA #4 may have been generated and stored in the fourth region in the memory 144. CTC #3 and CTC #4 may include pieces of first location information WFLAG #3 and WFLAG #4, respectively, and pieces of second location information PBA #3 and PBA #4, respectively. In this case, the pieces of first location information WFLAG #3 or WFLAG #4 may indicate that the corresponding changeable firmware data FDATA #3 or FDATA #4 has been stored in the memory device 150. Furthermore, the pieces of second location information PBA #3 and PBA #4 may each be a physical address of a storage location in which the corresponding changeable firmware data, i.e., FDATA #3 or FDATA #4 has been stored in the memory device 150.

Furthermore, it is exemplified that two pieces of write data WRITE DATA #1 and WRITE DATA #2, requested to be written in the memory device 150 by the host 102 or an internal operation of the controller 130, have been cached in the write cache region of the memory 144. However, no changeable firmware data has been cached in the write cache region yet.

Referring to FIG. 4B, it is exemplified that as time elapses from the state illustrated in FIG. 4A, the first state $\{1^{ST}\_STATE\}$ of FDATA #1 of the two pieces of changeable firmware data FDATA #1 and FDATA #2, loaded into the third region in the memory 144, is updated to the second state $\{2^{ND}\_STATE\}$ by an internal operation of the controller 130, and thus writing in the memory device 150 is necessary.

Accordingly, an operation {1} of moving, from the firmware cache region to the write cache region, the updated FDATA #1, of the two pieces of changeable firmware data FDATA #1 and FDATA #2. At this time, FDATA #1 loaded into the firmware cache region is updated and thus assumes the second state $\{2^{ND}\_STATE\}$ while FDATA #1 stored in the memory device 150 is not updated and thus remains in the first state $\{1^{ST}\_STATE\}$. Thus, FDATA #1 updated and loaded into the firmware cache region may be different from FDATA #1 that remains unchanged in the memory device 150.

Then, an operation {2} of generating first location information WFLAG #1 of access information CTC #1 corresponding to the first piece FDATA #1 may be performed in response to the moving of the first piece FDATA #1 from the firmware cache region into the write cache region. In this case, the first location information WFLAG #1 of the access information CTC #1 corresponding to the first piece FDATA #1 may be information indicating that the first piece FDATA #1 has been cached in the write cache region. For example, the first location information WFLAG #1 is a flag. When a value of the flag is "0", it may indicate that the first piece FDATA #1 has been cached in the write cache region. When a value of the flag is "1", it may indicate that the first piece FDATA #1 has been stored in the memory device 150. Accordingly, in FIG. 4B, a value of the first location information WFLAG #1 may be "0."

Referring to FIG. 4C, an operation {3} of completing the write-back of the first piece FDATA #1 from the write cache region into the memory device 150 may be first performed. Accordingly, the first piece FDATA #1 stored in the memory device 150 may be in the second state $\{2^{ND}\_STATE\}$.

Furthermore, an operation {4} of changing a value of the first location information WFLAG #1 of the access information CTC #1 corresponding to the first piece FDATA #1 and generating second location information PBA #1 may be performed in response to the completion of the write-back of the first piece FDATA #1 from the write cache region into the memory device 150 via the write cache region.

At this time, the first location information WFLAG #1 of the access information CTC #1 corresponding to the first piece FDATA #1 may be changed from information indicating that the first piece FDATA #1 has been cached in the write cache region to information indicating that the first piece FDATA #1 has been stored in the memory device 150. For example, in FIG. 4C, a value of the first location information WFLAG #1 may be changed from "0" to "1." Furthermore, the second location information PBA #1 of the access information CTC #1 corresponding to the first piece FDATA #1 may be a physical address indicating a storage location in which the first piece FDATA #1 has been stored. For example, if the first piece FDATA #1 is stored in the No. 21 page of a No. 11 memory block among multiple memory blocks included in the memory device 150, a physical address indicative of the No. 21 page of the No. 11 memory block may be the second location information PBA #1 of the access information CTC #1 corresponding to the first piece FDATA #1.

Figure 5A:
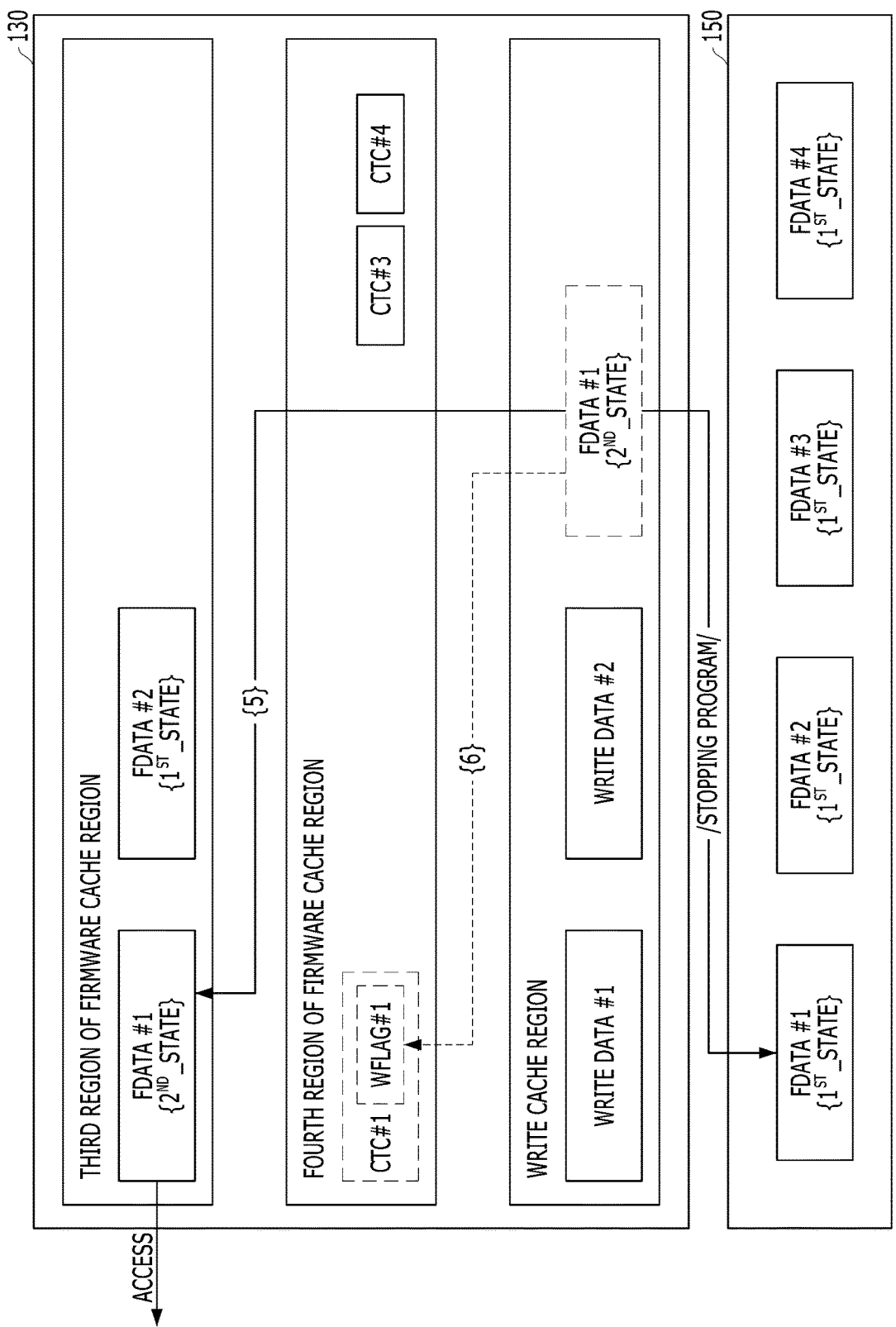
FIGS. 5A and 5B illustrate a second example of a firmware management operation.
Figure 5B:
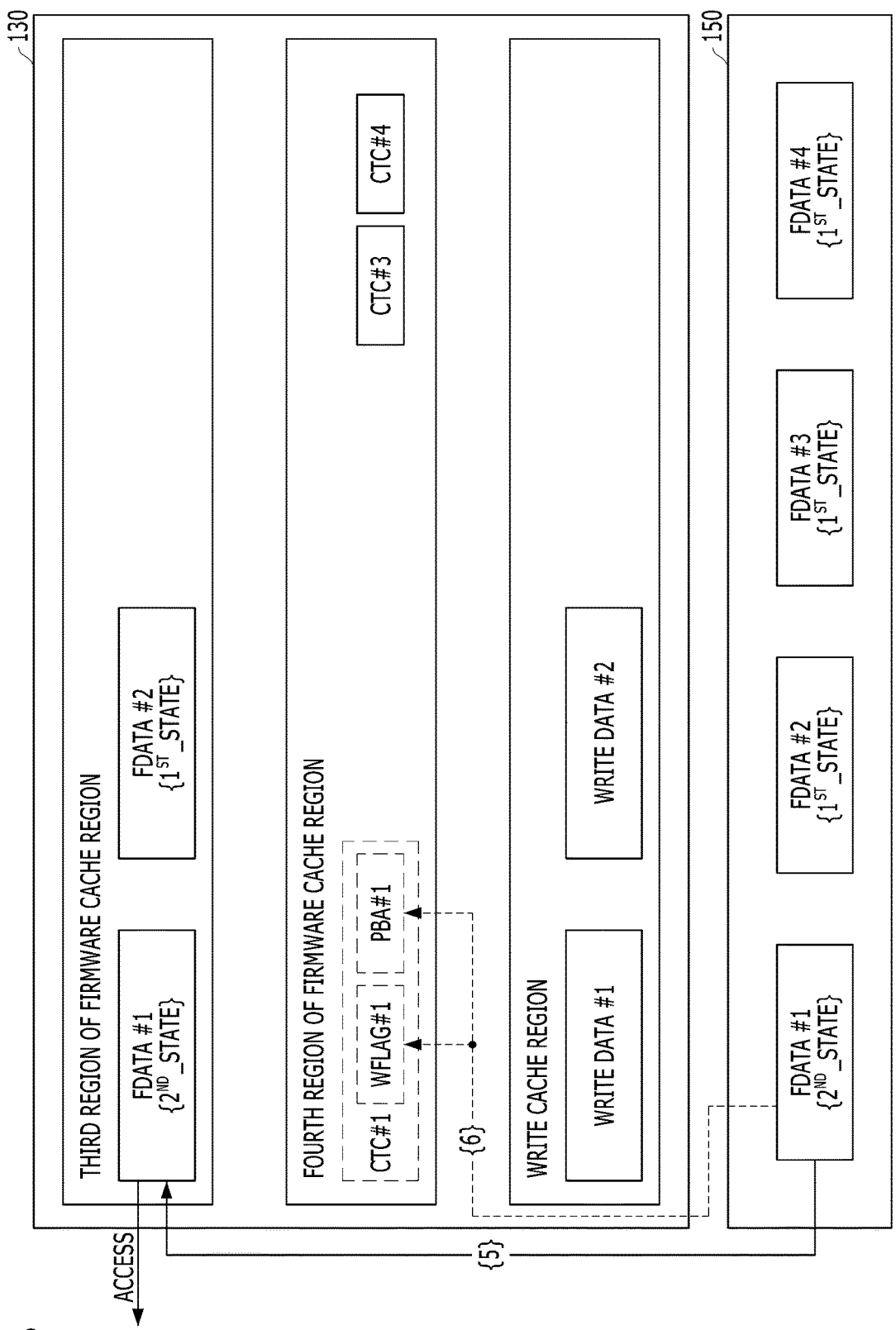

FIGS. 5A and 5B illustrate a second example of a firmware management operation.

FIGS. 5A and 5B illustrates a firmware management operation in which the controller 130 processes an access request for the changeable firmware data currently cached in the write cache region (see FIG. 4B) and currently written back in the memory device 150 (see FIG. 4C).

First, referring to FIG. 5A, the access request is for the first piece FDATA #1 currently cached in the write cache region (see FIG. 4B).

In this case, the controller 130 may identify whether the first piece FDATA #1 is cached into the firmware cache region. The controller 130 may determine that the first piece FDATA #1 has not been cached in the firmware cache region, as a result of the identification. Accordingly, the controller 130 may identify the first location information WFLAG #1 of the access information CTC #1 corresponding to the first piece FDATA #1 stored in the fourth region. The controller 130 may determine that the first piece FDATA #1 has been cached in the write cache region, as a result of the identification. Accordingly, the controller 130 may perform an operation {5} of moving the first piece FDATA #1 from the write cache region back to the firmware cache region while stopping an operation of writing back the first piece FDATA #1 into the memory device 150 (STOPPING PROGRAM). After the first piece FDATA #1 is cached back into the firmware cache region through operation {5}, an access operation may be performed on the first piece FDATA #1 in response to the access request for the first piece FDATA #1. At this time, the first piece FDATA #1 stored in the memory device 150 may continue to be in the first state $\{1^{ST}\_STATE\}$ because the first piece FDATA #1 in the second state $\{2^{ND}\_STATE\}$, cached in the write cache region, has not been programmed into the memory device 150.

Furthermore, an operation {6} of deleting a value of the first location information WFLAG #1 of the access information CTC #1 corresponding to the first piece FDATA #1 may be performed in response to the caching of the first piece FDATA #1 from the write cache region to the firmware cache region. That is, the operation {6} of deleting a value of the first location information WFLAG #1 of the access information CTC #1 corresponding to the first piece FDATA #1 may be performed because the access information CTC #1 corresponding to the first piece FDATA #1 is not valid anymore when the first piece FDATA #1 is cached back into the firmware cache region.

Referring to FIG. 5B, it is exemplified that an access request for the first piece FDATA #1 is written back to and thus currently stored in the memory device 150 (see FIG. 4C).

In this case, the controller 130 may identify whether the first piece FDATA #1 is cached into the firmware cache region. The controller 130 may determine that the first piece FDATA #1 has not been cached in the firmware cache region, as a result of the identification. Accordingly, the controller 130 may identify the first location information WFLAG #1 of the access information CTC #1 corresponding to the first piece FDATA #1 stored in the fourth region. The controller 130 may determine that the first piece FDATA #1 has been stored in the memory device 150, as a result of the identification. That is, the controller 130 may determine that the first piece FDATA #1 is in the second state $\{2^{ND}\_STATE\}$. Accordingly, an operation {5} of loading the first piece FDATA #1 from the memory device 150 into the firmware cache region may be performed with reference to the second location information PBA #1 of the access information CTC #1 corresponding to the first piece FDATA #1. After the first piece FDATA #1 is loaded into the firmware cache region through the operation {5}, an access operation may be performed on the first piece FDATA #1 in response to the access request.

Furthermore, an operation {6} of deleting values of the first location information WFLAG #1 and second location information PBA #1 of the access information CTC #1 corresponding to the first piece FDATA #1 may be performed in response to the loading of the first piece FDATA #1 from the memory device 150 into the firmware cache region. That is, the operation {6} of deleting values of the first location information WFLAG #1 and second location information PBA #1 of the access information CTC #1 corresponding to the first piece FDATA #1 may be performed because the access information CTC #1 corresponding to the first piece FDATA #1 is not valid any longer when the first piece FDATA #1 is loaded into the firmware cache region.

Figure 6A:
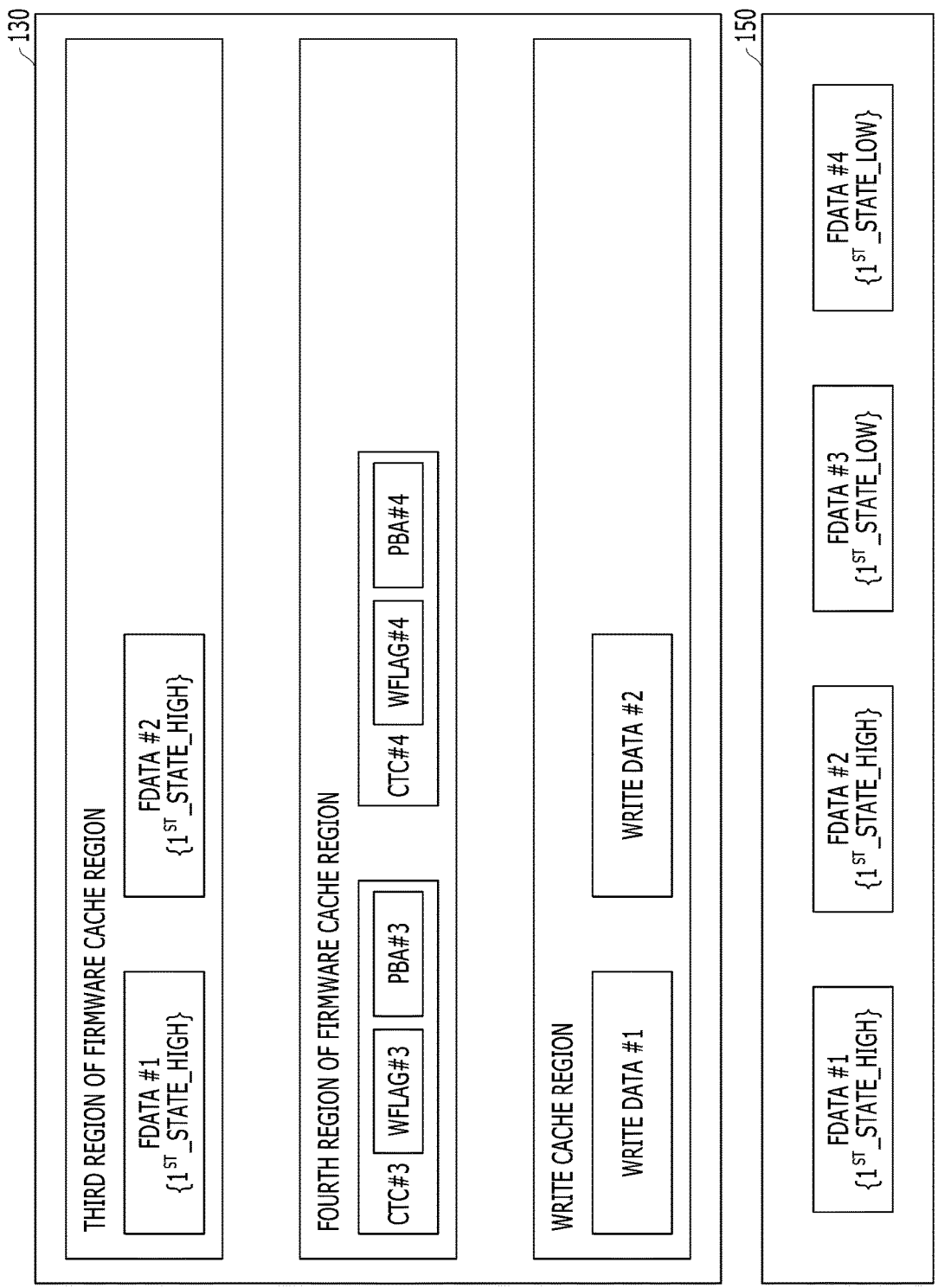
FIGS. 6A to 6C illustrate a third example of a firmware management operation.
Figure 6B:
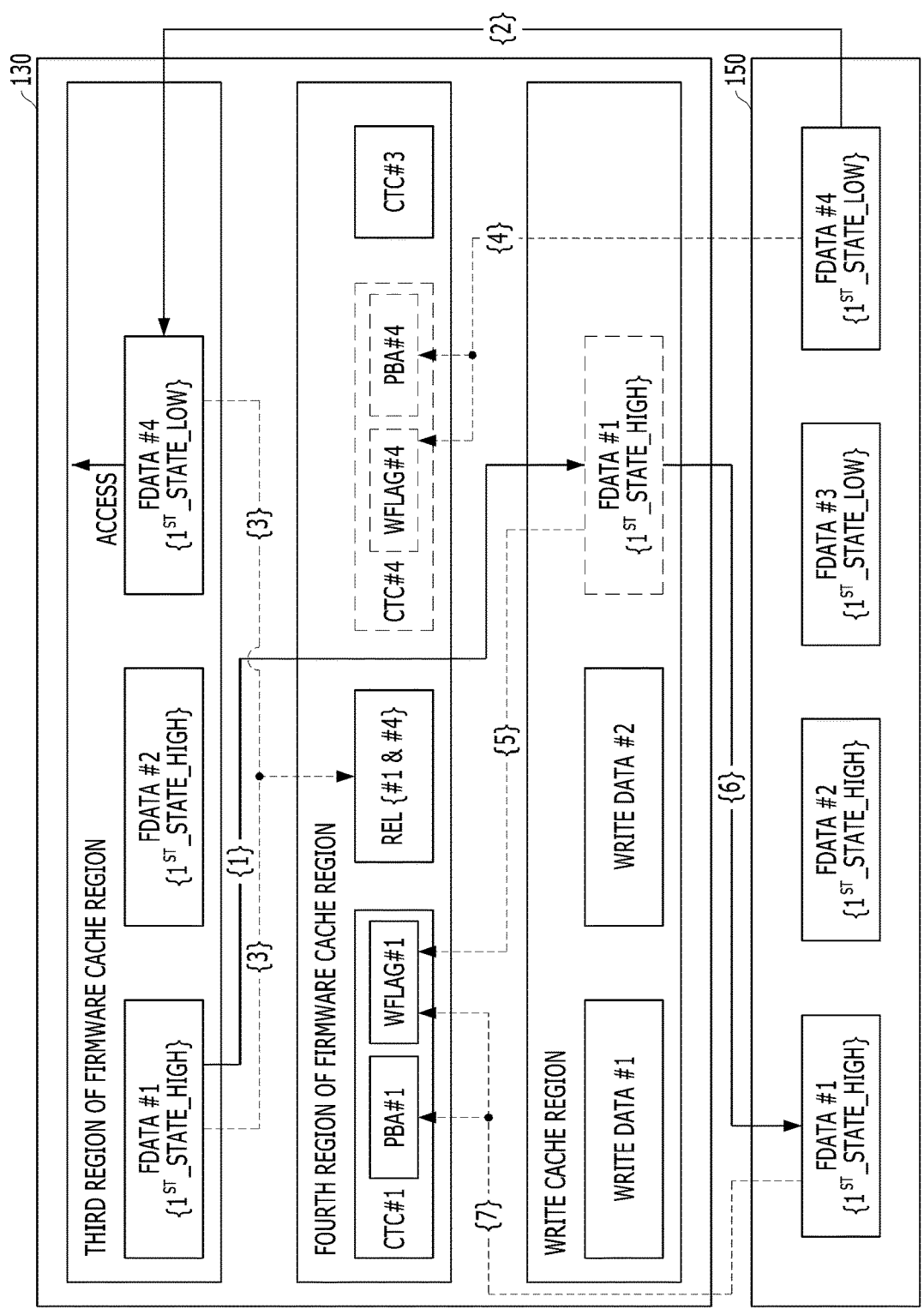
Figure 6C:
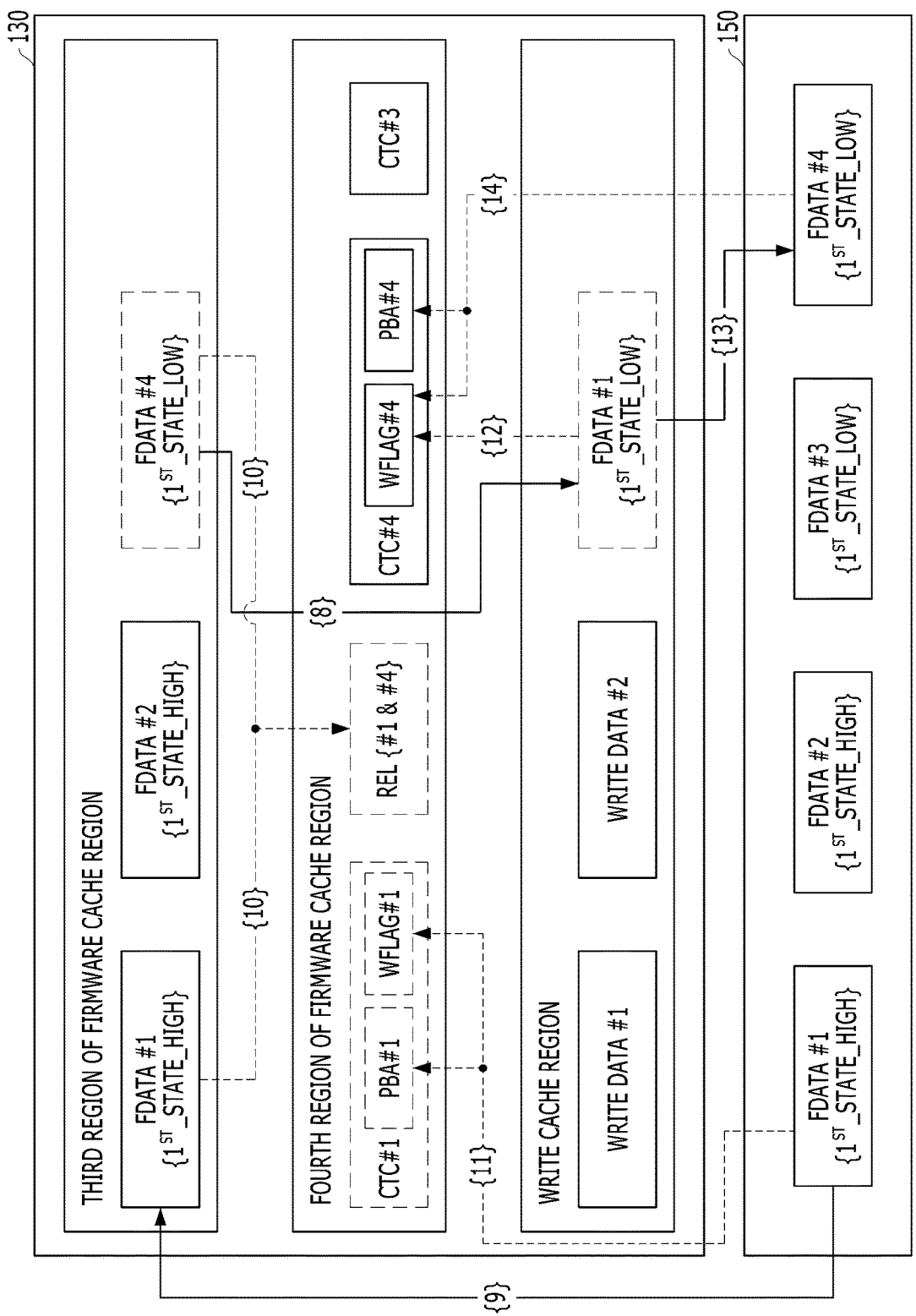

FIGS. 6A to 6C illustrate a third example of a firmware management operation.

FIGS. 6A to 6C illustrate a firmware management operation in which the controller 130 preferentially loads the first changeable firmware data {HIGH} into the firmware cache region with respect to the second changeable firmware data {LOW}.

First, referring to FIG. 6A, shows that changeable firmware data includes a total of four pieces. Accordingly, these four pieces FDATA #1, FDATA #2, FDATA #3, and FDATA #4 are stored in the memory device 150. It may be seen that FDATA #1, FDATA #2, FDATA #3, and FDATA #4 stored in the memory device 150 are in the first state $\{1^{ST}\_STATE\}$.

In this case, two pieces of changeable firmware data FDATA #1 and FDATA #2 are first changeable firmware data {HIGH} which may be used as a variable in a process of executing an operation corresponding to first firmware data, and the remaining two pieces of changeable firmware data FDATA #3 and FDATA #4 are second changeable firmware data {LOW} which may be used as a variable in a process of executing an operation corresponding to second firmware data. Each of FDATA #1 and FDATA #2, denoted as {HIGH} to indicate a relatively high priority, have been preferentially loaded into the firmware cache region and only the remaining two pieces of changeable firmware data FDATA #3 and FDATA #4, each denoted {LOW} to indicate a relatively low priority, have been stored in the memory device 150. In this case, it may be seen that FDATA #1 and FDATA #2 loaded into the firmware cache region may be in the first state $\{1^{ST}\_STATE\}$. That is, both FDATA #1 and FDATA #2 stored in the memory device 150 and FDATA #1 and FDATA #2 loaded into the memory 144 may be in the first state $\{1^{ST}\_STATE\}$ and may be the same as each other.

Furthermore, two pieces of access information CTC #3 and CTC #4 respectively corresponding to low priority pieces FDATA #3 and FDATA #4 {LOW} may have been generated and stored in the fourth region in the memory 144 because FDATA #3 and FDATA #4 have been stored only in the memory device 150 and have not been loaded into the firmware cache region. In this case, CTC #3 and CTC #4 may include pieces of first location information WFLAG #3 and WFLAG #4, respectively, and pieces of second location information PBA #3 and PBA #4, respectively. In this case, each of WFLAG #3 and WFLAG #4 may be information indicating that each of FDATA #3 and FDATA #4 has been stored in the memory device 150. Furthermore, each of PBA #3 and PBA #4 may be physical addresses indicating respective storage locations at which FDATA #3 and FDATA #4 are stored.

Furthermore, two pieces of write data WRITE DATA #1 and WRITE DATA #2 requested to be written in the memory device 150 by the host 102 or an internal operation of the controller 130 have been cached in the write cache region of the memory 144. That is, changeable firmware data has not been cached in the write cache region yet.

Referring to FIG. 6B, as time elapses from the state illustrated in FIG. 6A, an access request for FDATA #4{LOW} of FDATA #3{LOW} and FDATA #4{LOW} stored in the memory device 150 is issued. At this time, the third region has a storage capacity capable of storing only two pieces of changeable firmware data. FIGS. 6A and 6B show that the third region is full of the changeable firmware data.

In the case in which the third region is full of changeable firmware data (i.e., FDATA #1{HIGH} and FDATA #2{HIGH}) and the access request for FDATA #4{LOW} is received, the controller 130 may identify whether FDATA #4{LOW} is cached into the firmware cache region. The controller 130 may determine that FDATA #4{LOW} has not been cached into the firmware cache region, as a result of the identification. Accordingly, the controller 130 may perform a program operation of writing, in the memory device 150, either of the two pieces of first changeable firmware data FDATA #1{HIGH} and FDATA #2{HIGH} cached in the firmware cache region and an operation of loading the second piece FDATA #4{LOW} into the firmware cache region. At this time, the controller 130 may perform the program operation of writing, in the memory device 150, either of FDATA #1{HIGH} and FDATA #2{HIGH} cached in the firmware cache region in order to load FDATA #4{LOW} into the firmware cache region, although FDATA #1{HIGH} and FDATA #2{HIGH} cached in the firmware cache region are in the first state $\{1^{ST}\_STATE\}$ and have not been updated.

First, the controller 130 may perform an operation {1} of moving, to the write cache region, FDATA #1{HIGH} of FDATA #1{HIGH} and FDATA #2{HIGH} already cached into the firmware cache region, in order to write FDATA #1{HIGH} in the memory device 150.

Furthermore, the controller 130 may determine or confirm that FDATA #4{LOW} has been stored in the memory device 150 by identifying the first location information WFLAG #4 of the access information CTC #4 corresponding to FDATA #4{LOW} stored in the fourth region of the firmware cache region. Accordingly, the controller 130 may perform an operation {2} of loading, into the firmware cache region, FDATA #4{LOW} stored in the memory device 150, with reference to the second location information PBA #4 of the access information CTC #4 corresponding to FDATA #4{LOW}. After FDATA #4{LOW} is loaded into the firmware cache region through the operation {2} as described above, an access operation may be performed on FDATA #4{LOW} in response to the access request therefor.

Furthermore, the controller 130 may perform an operation {3} of generating relation information REL{#1 & #4} indicating a relationship between FDATA #1{HIGH} and FDATA #4{LOW} and storing the relation information in the fourth region of the firmware cache region.

Furthermore, the controller 130 may perform an operation {4} of deleting values of the first location information WFLAG #4 and second location information PBA #4 of the access information CTC #4 corresponding to FDATA #4{LOW}, in response to the loading of FDATA #4{LOW}, stored in the memory device 150, into the firmware cache region through the operation {2}.

Furthermore, the controller 130 may perform an operation {5} of generating first location information WFLAG #1 of access information CTC #1 corresponding to FDATA #1{HIGH}, in response to the storing thereof, moved from the firmware cache region, in the write cache region. In this case, the first location information WFLAG #1 of the access information CTC #1 corresponding to FDATA #1{HIGH} may indicate that FDATA #1{HIGH} has been cached in the write cache region.

Furthermore, the controller 130 may perform an operation {6} of programming, in the memory device 150, FDATA #1{HIGH} cached in the write cache region through the operation {1}.

Furthermore, the controller 130 may perform an operation {7} of changing a value of the first location information WFLAG #1 of the access information CTC #1, corresponding to FDATA #1{HIGH}, and generating second location information PBA #1 in response to the completion of the write-back of FDATA #1{HIGH} to the memory device 150 through operation {6}. At this time, the first location information WFLAG #1 of the access information CTC #1 corresponding to FDATA #1{HIGH} may be changed from indicating that FDATA #1{HIGH} has been cached in the write cache region to indicating that FDATA #1{HIGH} has been stored in the memory device 150. Furthermore, the second location information PBA #1 of the access information CTC #1 corresponding to FDATA #1{HIGH} may be a physical address indicating a storage location at which FDATA #1{HIGH} has been stored.

Referring to FIG. 6C, it is exemplified that as time elapses from the state illustrated in FIG. 6B, the processing of the access request for FDATA #4{LOW} loaded into the firmware cache region has been completed.

In this case, the controller 130 may perform a program operation of writing, in the memory device 150, FDATA #4{LOW} stored in the third region because the processing of the access request for FDATA #4{LOW} has been completed although FDATA #4{LOW} stored in the third region is in the first state $\{1^{ST}\_STATE\}$ and has not been updated.

First, the controller 130 may perform an operation {8} of moving, to the write cache region, FDATA #4{LOW} stored in the third region in order to write FDATA #4{LOW} in the memory device 150, in response to the completion of the processing of the access request for FDATA #4{LOW}.

Furthermore, the controller 130 may identify the relation information REL {#1 & #4}, corresponding to FDATA #4{LOW}, in the fourth region of the firmware cache region. The controller 130 may determine or confirm that FDATA #4{LOW} and FDATA #1{HIGH} are related, as a result of the identification. Accordingly, the controller 130 may determine that FDATA #1{HIGH} has been stored in the memory device 150, by identifying the first location information WFLAG #1 of the access information CTC #1 corresponding to FDATA #1{HIGH} stored in the fourth region of the firmware cache region. Accordingly, the controller 130 may perform an operation {9} of loading, into the firmware cache region, FDATA #1{HIGH} stored in the memory device 150, with reference to the second location information PBA #1 of the access information CTC #1 corresponding to FDATA #1{HIGH}.

Furthermore, the controller 130 may perform an operation {10} of deleting, from the fourth region, the relation information REL{#1 & #4} indicating the relationship between FDATA #1{HIGH} and FDATA #4{LOW}.

Furthermore, the controller 130 may perform an operation {11} of deleting values of the first location information WFLAG #1 and second location information PBA #1 of the access information CTC #1 corresponding to FDATA #1{HIGH}, in response to the loading of FDATA #1{HIGH}, stored in the memory device 150, into the firmware cache region through operation {9}.

Furthermore, the controller 130 may perform an operation {12} of generating first location information WFLAG #4 of access information CTC #4 corresponding to FDATA #4{LOW}, in response to the storing of FDATA #4{LOW}, moved from the firmware cache region, in the write cache region. In this case, the first location information WFLAG #4 of the access information CTC #4 corresponding to FDATA #4{LOW} may indicate that FDATA #4{LOW} has been cached in the write cache region.

Furthermore, the controller 130 may perform an operation {13} of programming, into the memory device 150, FDATA #4{LOW} cached in the write cache region through operation {8}.

Furthermore, the controller 130 may perform an operation {14} of changing a value of the first location information WFLAG #4 of the access information CTC #4, corresponding to FDATA #4{LOW}, and generating second location information PBA #4, in response to the completion of the write-back of FDATA #4{LOW} to the memory device 150 through operation {13}. In this case, the first location information WFLAG #4 of the access information CTC #4 corresponding to FDATA #4{LOW} may be changed from indicating that FDATA #4{LOW} has been stored in the write cache region to indicating that FDATA #4{LOW} has been stored in the memory device 150. Furthermore, the second location information PBA #4 of the access information CTC #4 corresponding to FDATA #4{LOW} may be a physical address indicating a storage location at which FDATA #4{LOW} has been stored.

As described above, according to various embodiments, a memory system and memory controller and operating methods thereof, capable of optimizing the size of a memory used to load firmware are provided.

Furthermore, various embodiments enable minimizing total cost of the memory system.

Effects of the invention according to various embodiments are as follows.

According to various embodiments, changeable data within firmware that is changed by an operation of the memory system can be loaded/programmed in a volatile memory device or a non-volatile memory device in a runtime overlay manner. Accordingly, space of the volatile memory device used for the loading of the firmware can be optimized.

Other advantages and effects will be understood by those having ordinary skill in the art to which the disclosure pertains from the foregoing description.

Although various embodiments have been illustrated and described, it will be apparent to those skilled in the art in light of the present disclosure that various changes and modifications may be made without departing from the spirit and scope of the invention as defined in the following claims.

What is claimed is:

1. A memory system comprising:
   a non-volatile memory device suitable for storing firmware;
   a volatile memory device comprising a write cache region for temporarily storing write data to be programmed into the non-volatile memory device and a firmware cache region for loading the firmware from the non-volatile memory device; and
   a controller suitable for:
   moving, to the write cache region, changeable firmware data that is generated or modified in the firmware cache region during an operation of the controller;
   programming the changeable firmware data, after it is moved into the write cache region, into the non-volatile memory device; and
   generating, in the firmware cache region, access information of the changeable firmware data, wherein the access information in the controller includes first location information indicating whether the changeable firmware data is stored in the write cache region or the non-volatile memory device.

2. The memory system of claim 1, wherein the access information further includes a physical address indicating the location into which the changeable firmware data is programmed in the non-volatile memory device, as second location information.

3. The memory system of claim 2, wherein the controller is further suitable for deleting, from the write cache region, the changeable firmware data after the programming is completed.

4. The memory system of claim 2, wherein the controller is further suitable for moving, in response to an access request for the changeable firmware data, the changeable firmware data from the write cache region to the firmware cache region when it is determined that the changeable firmware data has been cached in the write cache region according to the first location information.

5. The memory system of claim 2, wherein the controller is further suitable for moving, in response to an access request for the changeable firmware data, the changeable firmware data from the non-volatile memory device to the firmware cache region according to the second location information when it is determined that the changeable firmware data has been programmed in the non-volatile memory device according to the first location information.

6. The memory system of claim 1,
wherein the changeable firmware data includes first and second changeable firmware data, and
wherein the controller is further suitable for:
classifying the variable firmware data into first changeable firmware data having a relatively high weight and second changeable firmware data having a relatively low weight, and
preferentially loading the first changeable firmware data into the firmware cache region.

7. The memory system of claim 6, wherein the controller is further suitable for:
programming, into the non-volatile memory device, a piece of the first changeable firmware data loaded into the firmware cache region to secure a space within the firmware cache region;
loading, into the secured space, a piece of the second changeable firmware data from the non-volatile memory device, the piece of the second changeable firmware data being access-requested; and
generating relation information in the firmware cache region, the relation information relating to the piece of the second changeable firmware data and the piece of the first changeable firmware data.

8. The memory system of claim 7, wherein the controller is further suitable for:
programming, upon completion of servicing the access request for the piece of the second changeable firmware data, the piece of the second changeable firmware data into the non-volatile memory device;
loading the piece of the first changeable firmware data into the firmware cache region using the relation information; and
deleting the relation information.

9. The memory system of claim 6, wherein:
the first changeable firmware data is used in at least one of a read operation, a program operation, an erase operation and a map update operation, and the second changeable firmware data is used in at least one of a boot operation and a background operation.

10. An operating method of a memory system, comprising a non-volatile memory device suitable for storing firmware and a volatile memory device comprising a write cache region for temporarily storing write data to be programmed into the non-volatile memory device and a firmware cache region for loading the firmware from the non-volatile memory device, the operating method comprising:
moving, to the write cache region, changeable firmware data that is generated or modified in the firmware cache region during an operation of the memory system;
programming the changeable firmware data, after it is moved into the write cache region, into the non-volatile memory device; and
generating, in the firmware cache region, access information of the changeable firmware data,
wherein the access information includes first location information indicating whether the changeable firmware data is stored in the write cache region or the non-volatile memory device.

11. The operating method of claim 10, wherein the access information further includes
a physical address indicating a location, into which the changeable firmware data is programmed in the non-volatile memory device, as second location information.

12. The operating method of claim 11, further comprising deleting, from the write cache region, the changeable firmware data after the programming.

13. The operating method of claim 11, further comprising moving, in response to an access request for the changeable firmware data, the changeable firmware data from the write cache region to the firmware cache region when it is determined that the changeable firmware data is cached in the write cache region according to the first location information.

14. The operating method of claim 11, further comprising moving, in response to an access request for the changeable firmware data, the changeable firmware data from the non-volatile memory device to the firmware cache region according to the second location information when it is determined that the changeable firmware data is programmed in the non-volatile memory device according to the first location information.

15. The operating method of claim 10, further comprising:
classifying the changeable firmware data into first changeable firmware data having a relatively high weight and second changeable firmware data having a relatively low weight, and
preferentially loading the first changeable firmware data into the firmware cache region.

16. The operating method of claim 15, further comprising:
programming, into the non-volatile memory device, a piece of the first changeable firmware data loaded into the firmware cache region to secure a space within the firmware cache region;
loading, into the secured space, a piece of the second changeable firmware data from the non-volatile memory device, the piece of second changeable firmware data being access-requested; and
generating relation information in the firmware cache region, the relation information relating to the piece of the second changeable firmware data and the piece of the first changeable firmware data.

17. The operating method of claim 16, further comprising:

programming, upon completion of servicing the access request for the piece of the second changeable firmware data, the piece of the second changeable firmware data into the non-volatile memory device;

loading the piece of the first changeable firmware data into the firmware cache region using the relation information; and deleting the relation information.

18. The operating method of claim 16, wherein:

the first changeable firmware data is used in at least one of a read operation, a program operation, an erase operation and a map update operation, and the second changeable firmware data is used in at least any one of a boot operation and a background operation.

19. A memory system comprising:

a nonvolatile memory device suitable for storing plural pieces of changeable firmware data;

a first cache suitable for caching one or more pieces among the plural pieces of changeable firmware data during an operation of the memory system;

a second cache; and a controller suitable for:

changing the one or more pieces cached in the first cache for use in an operation of the nonvolatile memory device;

moving the one or more pieces from the first cache to the second cache;

controlling the nonvolatile memory device to move the one or more pieces from the second cache to the nonvolatile memory device;

generating location information indicating whether the one or more pieces are stored in the second cache or the nonvolatile memory device; and moving, in response to an access request for a piece that is cache-missed in the first cache, from the second cache or the nonvolatile memory device to the first cache according to the location information.

* * * * *